May 22, 1923.

M. C. SCHWEINERT

GAUGE

Filed Aug. 12, 1915

1,455,890

WITNESSES:

INVENTOR
Maximilian C. Schweinert
By Attorneys,

Patented May 22, 1923.

1,455,890

UNITED STATES PATENT OFFICE.

MAXIMILIAN CHARLES SCHWEINERT, OF WEST HOBOKEN, NEW JERSEY.

GAUGE.

Application filed August 12, 1915. Serial No. 45,166.

*To all whom it may concern:*

Be it known that I, MAXIMILIAN CHARLES SCHWEINERT, a citizen of the United States of America, residing at West Hoboken, in the county of Hudson and State of New Jersey, have invented certain new and useful Improvements in Gauges, of which the following is a specification.

This invention relates to gauges, and aims to provide certain improvements therein.

The present invention is especially directed to gauges of the type which are adapted to fit on tire valves for the purpose of ascertaining the pressure within the tire. In this type of valve a so-called deflater is provided in the gauge which is adapted to press down the stem of the tire valve so that the latter is opened and air is permitted to pass upwardly into the gauge. In various types of tire valve the ends of the valve stems do not occupy the same position with relation to the top of the valve casing or shell and even in the same type there are found to be slight differences in the length of the stems. While the foot of the gauge is adapted to make a tight joint with the exterior or end of the valve casing it sometime happens that the deflating pin is not sufficiently long to properly depress the valve stem in order to open the valve. It has heretofore been proposed to provide an adjustable deflating pin which extends through the wall of the gauge, but in the pencil or cylindrical type of gauge such means are not available for the purpose. According to the present invention in its preferred form I provide a deflating pin which is capable of extension for the purpose of increasing the effective length of the pin. The invention is preferably used in connection with the pencil type of gauge wherein the deflating pin is mounted in line with the axis of the gauge and is fixed with relation to the casing of the latter. When the adjustment is made it may be made permanent by flattening or otherwise clinching the parts.

The accompanying drawings illustrate the invention in its preferred form,—

Figure 1:
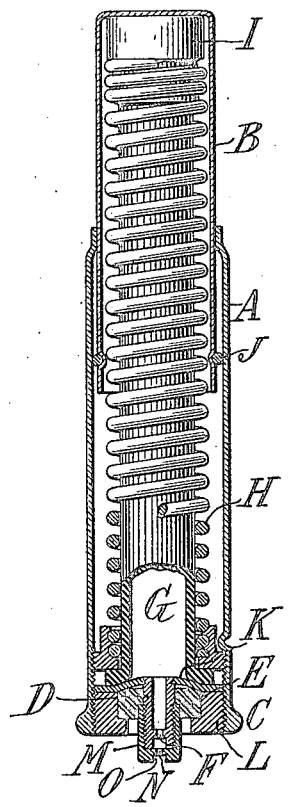
Fig. 1 is a central vertical section of a gauge provided with my invention, some of the parts being shown in elevation.
Figure 2:
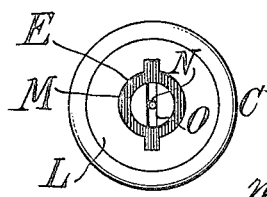
Fig. 2 is a bottom or under side view of Fig. 1.

Referring to the drawings, the invention is illustrated in connection with a gauge of the Schrader type, such gauge comprising a casing A, an extension member B mounted to move axially of the casing A, and a foot C which is designed to make a tight joint with the tire valve casing and which carries a fixed deflating pin D. In the type of valve shown a packing washer E is provided in the foot of the casing which presses on the top of the tire valve while the deflating pin D enters the open end of the latter and presses down the valve stem of the tire valve. Air then enters through the opening F of the deflating pin and passes upwardly into an elastic chamber G which is surrounded by a spring H attached to the valve casing at its lower end and to a plunger I at its upper end. The lower end of the elastic chamber G is also fixed to the casing while its upper end bears against the lower side of the plunger I. As the chamber G extends against the pressure of its spring it moves the sleeve B upwardly and when the gauge is removed from the tire said sleeve is held in its registering position by a friction ring J. This type of gauge forms the subject-matter of certain applications for Letters Patent hereinbefore filed by me as joint inventor with Henry P. Kraft, among others: Serial No. 552,111, filed March 28, 1910, and Serial No. 712,724, filed August 1, 1912. In this type of gauge it is customary to mount the pin fixedly in position, this being done in the instance shown by riveting it to a disk K which is clamped in position by a nut L. This pin has formerly had no capacity for adjustment. It is desirable, however, that some means be provided for securing such adjustment, in order to fit the gauge for use in different types of valves. Such means are also useful in constructing the gauges, for compensating for variations in the parts.

According to the present invention I provide a very simple means for accomplishing this purpose which consists preferably in forming the pin in two parts, a pin proper or projection D and a cap M adapted to fit on the end of the pin D and being capable of adjustment with relation to the latter. Preferably the pin proper D and cap M are screw-threaded so that the cap may be accurately adjusted and held in its adjusted positions. Normally the packing washer E either closely engages the pin D or is only slightly separated therefrom. When the sleeve is in position upon the pin it will hence normally be engaged by the walls of the packing E which introduces a frictional effect which assists in holding the cap in its adjusted positions. The cap is provided with an opening N similar to the opening F in the pin and preferably also with a slot O of less width than the head of the valve stem so that after the cap has engaged the stem and moved it downwardly the air within the tire will find a free passage through the cap into the gauge.

The operation of the device will be apparent from the foregoing description. In case the valve stem lies so far below the top of the valve casing that the pin in its screwed-up position is not long enough to depress it, the pin proper is lengthened by unscrewing the cap. Or if in the process of construction the pin proper is found too short, the cap can be unscrewed to the proper point. In either case a slight pinching with a tool is sufficient to distort the circular shape of cap so as to fix it permanently in place.

While I have shown and described one form of the invention, it will be understood that I do not wish to be limited thereto, as various changes may be made therein without departing from the invention.

What I claim is:—

1. In a gauge, a casing, a deflating means at the foot of said casing, comprising a projecting part fixed in the foot of the casing, and a cap screwing on said fixed part, said cap having an opening therethrough and having a portion adapted to contact with the stem of a tire valve.

2. In a gauge, a casing, a resilient packing thereon adapted to make a contact joint with a tire valve casing when pressed thereon, and a deflator adapted to open a tire valve, substantially simultaneously with the making of contact by said resilient packing with said tire valve casing, said deflator being normally fixed, but adjustable, whereby the relation to said packing at the moment of opening of said tire valve thereby may be adjusted.

3. In a gauge, a casing, a resilient packing thereon adapted to make a contact joint with a tire valve casing when pressed thereon, and a deflator adapted to open a tire valve substantially simultaneously with the making of contact by said resilient packing with said tire valve casing, and a longitudinally-extending pressure-responsive part in line with said deflator, said deflator being normally fixed, but adjustable, whereby the relation to said packing at the moment of opening of said tire valve thereby may be adjusted.

4. In a gauge, a casing, a resilient packing thereon adapted to make a contact joint with a tire valve casing when pressed thereon, and a deflator adapted to open a tire valve substantially simultaneously with the making of contact by said resilient packing with said tire valve casing, said deflator being normally fixed, but adjustable, whereby the relation to said packing at the moment of opening of said tire valve thereby may be adjusted, said deflator having a passageway for air therethrough and said packing surrounding and making contact with the outer part of said deflator.

5. In a gauge, a casing, a resilient packing thereon adapted to make a contact joint with a tire valve casing when pressed thereon, and a deflator adapted to open a tire valve substantially simultaneously with the making of contact by said resilient packing with said tire valve casing, said deflator being normally fixed, but adjustable, whereby the relation to said packing at the moment of opening of said tire valve thereby may be adjusted, said deflator comprising a projection and a cap thereon.

6. In a gauge, a casing, a resilient packing thereon adapted to make a contact joint with a tire valve casing when pressed thereon, and a deflator adapted to open a tire valve substantially simultaneously with the making of contact by said resilient packing with said tire valve casing, said deflator being normally fixed, but adjustable, whereby the relation to said packing at the moment of opening of said tire valve thereby may be adjusted, said deflator comprising a projection and a cap adjustable thereon, said cap being surrounded by and in contact with said resilient packing, whereby movement of said cap is resisted.

7. In a gauge, a casing, a resilient packing thereon adapted to make a contact joint with a tire valve casing when pressed thereon, and a deflator adapted to open a tire valve substantially simultaneously with the making of contact by said resilient packing with said tire valve casing, said deflator being normally fixed, but adjustable, whereby the relation to said packing at the moment of opening of said tire valve thereby may be adjusted, said deflator comprising a projection and a cap thereon, said cap and projection having a screw-threaded connection, said cap being surrounded by and in contact with said resilient packing, whereby movement of said cap on said projection is resisted.

In witness whereof, I have hereunto signed my name in the presence of two subscribing witnesses.

MAXIMILIAN CHARLES SCHWEINERT.

Witnesses:
ARTHUR C. FRASER,
FRED WHITE.